United States Patent [19]

Ullrich

[11] Patent Number: 5,398,651
[45] Date of Patent: Mar. 21, 1995

[54] PISTON ENGINE

[75] Inventor: Günter Ullrich, Hemsbach, Germany

[73] Assignee: Firma Carl Freudenberg, Weinheim, Germany

[21] Appl. No.: 130,349

[22] Filed: Oct. 1, 1993

[30] Foreign Application Priority Data

Oct. 27, 1992 [DE] Germany .................. 42 36 185.0

[51] Int. Cl.6 ............................................. F02B 75/06
[52] U.S. Cl. ................................... 123/192.1; 74/604
[58] Field of Search ....................... 123/192.1; 74/604

[56] References Cited

U.S. PATENT DOCUMENTS 1,723,430  8/1929  Lee ........................................ 74/604
4,781,156  11/1988  Berger et al. ......................... 74/604

Primary Examiner—Noah P. Kamen
Attorney, Agent, or Firm—Kenyon & Kenyon

[57] ABSTRACT

The disclosure teaches a piston engine having at least one reciprocating piston, a crankshaft rotatable within a support bracket, and a piston rod connecting the piston with the crankshaft, with an inertial mass mounted on the support bracket for movement with three degrees of freedom. A method for retrofitting a piston engine is also provided.

18 Claims, 1 Drawing Sheet

PISTON ENGINE

FIELD OF THE INVENTION

The invention relates generally to piston engines and more particularly to a piston engine with reduced noise.

BACKGROUND OF THE INVENTION

Piston engines are well known and often produce harsh noise emissions.

SUMMARY AND ADVANTAGES OF THE INVENTION

An object of the invention is to provide a piston engine with reduced noise emissions.

The present invention therefore provides a piston engine comprising a support bracket; a crankshaft rotatably disposed in the support bracket; at least one piston; a piston rod connecting the piston with the crankshaft; a spring element connected to the support bracket; and an inertial mass connected to the spring element, the spring element and inertial mass operating to reduce noise caused by movement of the piston. A method for reducing the noise of a piston engine which has a support bracket, a crankshaft and at least one piston is also provided, the method comprising the step of attaching an inertial mass to the support bracket through a spring element, so as to reduce noise caused by movement of the piston.

In the piston engine according to the invention, provision is made for an inertial mass to be mounted on a support bracket and to be movable parallel to the piston and/or to the rotational axis of the crankshaft by means of a spring element. The primary excitation of the support bracket caused by the reciprocating motion of the piston can be reduced by the inertial mass being movable parallel to the piston. The motion of the piston however causes secondary movements of the crankshaft, said movements extending at least parallel to its rotational axis. For this reason, the inertial mass should additionally be freely moveable at least parallel to the rotational axis of the crankshaft, and more advantageously movable in three mutually perpendicular directions. The support bracket is connected rigidly with the engine housing. Reduction of the excitation of the support bracket has considerable effects on the housing of the piston engine supporting the support bracket, resulting in significant reduction of the noise emitted from the housing.

The invention utilizes the Tilger effect to produce this effect as well as damping effects. The elasticity and damping of the spring element and the size of the inertial mass must be tuned to one another to achieve optimum effects in a certain way. The knowledge required for this purpose is known to a person skilled in the art of vibration.

To achieve high effectiveness, the inertial mass must be mounted at a point on the support bracket where especially large vibration swings occur during correct operation. Mounting roughly in the middle of the support bracket is preferred for this reason.

It has been found to be especially simple and effective for the inertial mass to be mounted on the end of the support bracket away from the piston. In existing piston engines, a free space of considerable size is already available in this area. Modification of the support bracket according to the invention does not involve great expense in such cases.

During proper use, vibrations can occur in a piston engine in mutually different directions. In order to be able to suppress all these vibrations effectively, it is advantageous to make the spring element of rubber.

The spring element can be attached in the simplest case by direct revulcanization to a portion of the support bracket. Manufacturing costs are at a minimum in such a design.

On the other hand, in cases in which retrofitting of a piston engine is involved, it has been found advantageous for the inertial mass to be mountable by retrofitting, using tools. For this purpose, the spring element can be mounted on the side of a support plate away from the inertial mass, with the support plate and the support bracket being connectable rigidly together, for example by screwing one into the other. The inertial mass and the support plate in such a design can be connected integrally by the spring element, for example by direct vulcanization in the gap between the inertial mass and the support plate.

An advantage of the present invention is that a defined reduction in noise emissions from a piston engine can be achieved at a low cost.

BRIEF DESCRIPTION OF THE DRAWING

The invention will now be described in greater detail with reference to FIG. 1, which shows a piston engine schematically and partially in cross-section.

DETAILED DESCRIPTION

Figure 1:
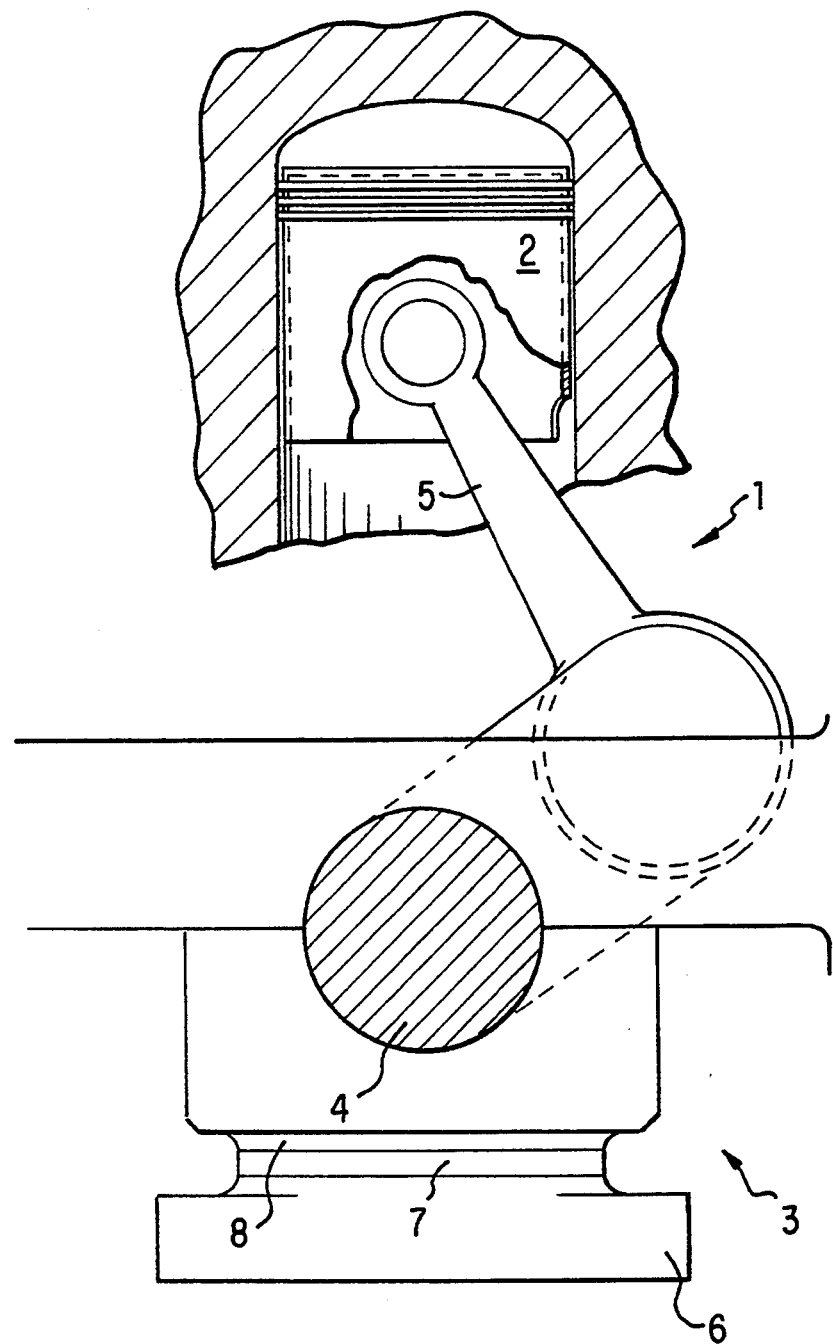

FIG. 1 shows a piston engine comprising a reciprocating piston 2, a crankshaft 4 rotatable within a support bracket 3, and a piston rod 5 connecting piston 2 with crankshaft 4. An inertial mass 6 is fastened by means of a rubber spring element 7 to support bracket 3 so as to be at least movable parallel to piston 2. Spring element 7 is connected on the side opposite inertial mass 6 to a support plate 8 rigidly attached by two retaining screws to support bracket 3. The support plate 8 and support bracket 3 may also be fashioned so as to allow support plate 8 to be screwable into support bracket 3. The size of inertial mass 6 is tuned to the spring elasticity and damping of spring element 7, so that the vibrations of the support bracket that occur during proper operation undergo a defined damping. The inertial mass is freely movable relative to the support bracket in three mutually perpendicular directions.

If a plurality of pistons is arranged sequentially in a piston engine and connected by piston rods with a crankshaft, it is recommended to supply each of the support brackets with an inertial mass connected by a spring element.

What is claimed is:
1. A piston engine comprising:
   a support bracket;
   a crankshaft rotatably disposed in the support bracket;
   at least one piston;
   a piston rod connecting the piston with the crankshaft;
   a spring element connected to the support bracket; and
   a vibration-driven inertial mass connected solely to the spring element, the spring element and inertial mass operating to reduce noise caused by movement of the piston.

2. The piston engine as recited in claim 1 wherein the spring element is connected to the support bracket on a first side, and to the inertial mass on a second, opposing side so that the inertial mass is free to move in at least one direction.

3. The piston engine as recited in claim 1 wherein the spring element is made of rubber.

4. The piston engine as recited in claim 1 wherein the inertial mass and spring element are located on the support bracket directly opposite the piston.

5. A piston engine comprising:
a support bracket;
a support plate rigidly attached to the support bracket;
a crankshaft rotatably disposed in the support bracket;
at least one piston;
a piston rod connecting the piston with the crankshaft;
a spring element connected to the support plate;
a vibration-driven inertial mass connected solely to the spring element, the spring element and inertial mass operating to reduce noise caused by movement of the piston.

6. The piston engine as recited in claim 5 wherein the support plate is screwed into the support bracket.

7. The piston engine as recited in claim 5 wherein the support plate, the spring element and the inertial mass are integrally connected.

8. A method for reducing noise in a piston engine which has a support bracket, a crankshaft rotatably disposed in the support bracket and at least one piston, the method comprising the steps of:
attaching a freely moveable inertial mass to the support bracket solely through a spring element, so as to reduce noise caused by movement of the piston.

9. The method as recited in claim 8 wherein the inertial mass and spring element are placed on the support bracket directly opposite the piston.

10. The method as recited in claim 8 further comprising the step of first attaching the inertial mass to a support plate through the spring element, the support plate then being attached to the support bracket.

11. The method as recited in claim 8 wherein the spring element is made of rubber.

12. The method as recited in claim 11 wherein the spring element is attached to the support bracket by vulcanization.

13. A piston engine comprising:
a support bracket;
a crankshaft rotatably disposed in the support bracket;
at least one piston;
a piston rod connecting the piston with the crankshaft;
a rubber spring element connected to the support bracket; and
an inertial mass connected to the spring element.

14. A piston engine comprising:
a support bracket;
a crankshaft rotatably disposed in the support bracket;
at least one piston;
a piston rod connecting the piston with the crankshaft;
a spring element connected to the support bracket opposite the piston; and
an inertial mass connected to the spring element, the spring element and inertial mass operating to reduce noise caused by movement of the piston.

15. A piston engine comprising:
a support bracket;
a support plate rigidly attached to the support bracket;
a crankshaft rotatably disposed in the support bracket;
at least one piston;
a piston rod connecting the piston with the crankshaft;
a spring element integral with the support plate;
an inertial mass integral with the spring element, the spring element and inertial mass operating to reduce noise caused by movement of the piston.

16. A method for reducing noise in a piston engine which has a support bracket, a crankshaft rotatably disposed in the support bracket and at least one piston, the method comprising the steps of:
attaching an inertial mass to the support bracket through a spring element, the spring element and the inertial mass being placed opposite the piston.

17. A method for reducing noise in a piston engine which has a support bracket, a crankshaft rotatably disposed in the support bracket and at least one piston, the method comprising the steps of:
attaching an inertial mass to the support bracket through a rubber spring element.

18. The method as recited in claim 17 wherein the spring element is attached to the support bracket by vulcanization.

* * * * *